ABSTRACT OF THE DISCLOSURE

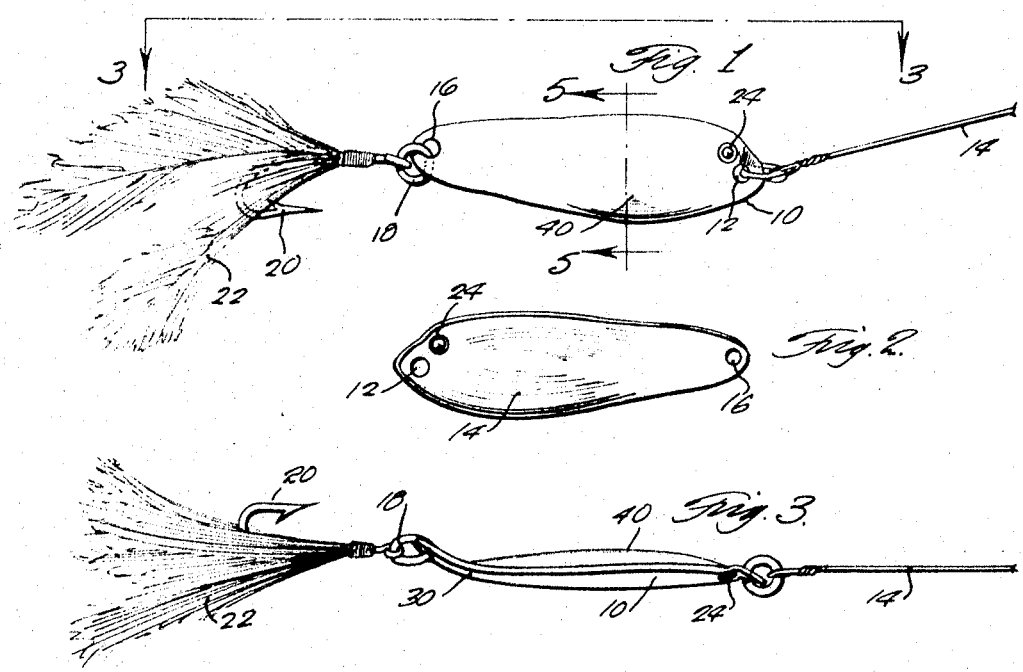
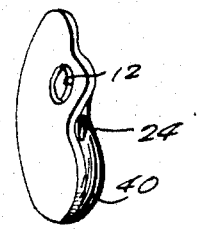  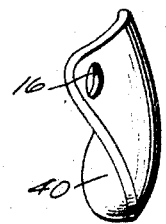
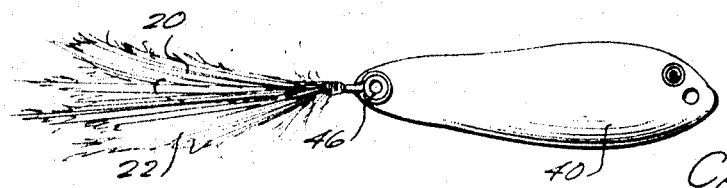
INVENTOR.
CARL W. ROES 3,461,595
FISHING LURE
Carl W. Roes, 119 Clarendon Ave.,
Pikesville, Md. 21208
Filed Dec. 15, 1966, Ser. No. 602,000
Int. Cl. A01k 85/00, 95/00
U.S. Cl. 43—42.39                                   2 Claims

A fishing lure having a longitudinal and transverse concave-convex spoon portion. Intermediate the ends of the spoon portion, a weight portion is mounted on and transversely coextensive with the concave side of the spoon portion. The weight portion is eccentric to both the longitudinal and transverse axes of the lure, and causes the lure to assume a substantially vertical position in the water.

---

The present invention relates to the field of fishing lures, and more particularly is directed to a new and improved fishing lure in which improved undulating and controlled action is characteristic of the lure as it is passed through the water during trolling.

In the construction and embodiment of the present invention, the weight area mass portion of the lure extends throughout the approximate length of the lure upon the lower edge thereof and below the center of gravity to create and maintain a new and different lure action when the fishing lure is trolled through the water.

An object of the invention, therefore, is to provide a lure construction to produce a lure action capable of being performed by the lure so that increased undulation and stimulation to the crippled action of a fish that is attracted by the fish to be caught is accomplished by the construction and use of the present invention.

It is a further object and principle of the invention to provide a fish lure which is particularly useful in fishing operations where the lure is drawn through the water for providing attractive inducement to fish.

A further object of the invention is to provide an improved fish lure that travels in a sinusoidal horizontal path or a sinusoidal generally horizontal path which oscillates and is of a simple and economical construction.

The above and other objects and advantages of the invention will become apparent upon full consideration of the following detailed description and accompanying drawings in which:

FIGURE 1 is a generally side elevation view of the fish lure embodying the present invention.

FIGURE 2 is the opposite side thereof.

FIGURE 3 is a top view of FIGURE 1 taken along lines 3—3 thereof.

FIGURE 4 is a front elevational view of FIGURE 1.

FIGURE 5 is a cross-sectional view taken along lines 5—5 of FIGURE 1.

FIGURE 6 is a rear view of FIGURE 1, taken from the left end thereof.

FIGURE 7 is a further modification in which the hook is differently attached to the end of the fish lure.

Referring now to the drawings, there is shown a fishing lure 10 and having a front end with a line receiving aperture 12 for connecting a line 14. Also provided thereto is a hook or line receiving aperture 16 similarly disposed on the fishing lure but at the rear end thereof and to which may be connected a ring 18 to which is then connected the hook 20 and the other trailing means 22, such as feathers and the like.

There is also provided on the fishing lure 10 a simulated eye 24 to lend reality to the fishing lure.

There is then disposed throughout the longitudinal dimension of the fishing lure a small concave-convex spoon construction 30 and there is also provided along the transverse and vertical axis of the fishing lure such as shown along line 5—5 an arcuate or concave-convex portion 34. Below the center of gravity of the lure, and to one end, preferably the forward end of the longitudinal center of the fishing lure, there is secured a weight massive portion 40 on the concave side of portion 34 and transversely coextensive therewith to provide an eccentric distribution of weight and which cooperates with the arcuate portion 30 so that as the fishing lure is pulled and trolled through the water, the lure is caused to oscillate and react in an action simulating a small fish. The longitudinally and transversely eccentric position of the weight portion 40 on the lure causes the transverse axis of the spoon portion to assume a substantially vertical position in the water.

The trailing hook 20 and the trailing means 22 may be otherwise connected by a rivet 46 as is shown in FIGURE 7, rather than the loop or ring 18 otherwise shown in FIGURES 1 and 3, thus creating a new type of hook mounting with a sinusoidal motion.

Additional embodiments of the invention in this specification will occur to others and therefore it is intended that the scope of the invention not be limited by the embodiments described hereinabove.

What is claimed is:

1. A fishing lure comprising an elongated body having a connecting aperture at each end, said elongated body comprising a concave-convex spoon portion extending longitudinally and intermediate its longitudinal ends and also in a transverse cross-sectional direction, and a weight massive portion eccentric to and coextensive with said transverse cross-section, below the center of gravity of the spoon portion, and to the longitudinal axis of the spoon portion and formed on the concave side of the spoon portion to provide added undulation of said lure as it is pulled through the water and to cause the transverse axis of the spoon portion to assume a substantially vertical position.

2. A fishing lure as defined in claim 1 wherein hook and trailing means for the fishing lure is secured centrally of the end of the lure by a coupling means.

References Cited

UNITED STATES PATENTS

| 2,680,926 | 6/1954 | Janis | 43—42.5 |
| 3,264,775 | 8/1966 | Nahigian | 43—42.39 |
| 2,069,724 | 2/1937 | Pflueger | 43—42.39 X |
| 2,463,889 | 3/1949 | Lundemo | 43—42.39 |
| 2,559,542 | 7/1951 | Mintner | 43—42.22 |
| 2,680,320 | 6/1954 | Rothbard | 43—42.5 X |
| 3,187,457 | 6/1965 | Karisch | 43—42.22 X |
| 3,193,963 | 7/1965 | Roedel | 43—42.39 |

FOREIGN PATENTS

| 97,020 | 11/1960 | Norway. |

ALDRICH F. MEDBERY, Primary Examiner

J. H. CZERWONKY, Assistant Examiner